United States Patent
Li et al.

(10) Patent No.: US 11,727,710 B2
(45) Date of Patent: *Aug. 15, 2023

(54) WEAKLY SUPERVISED SEMANTIC PARSING

(71) Applicant: Snap Inc., Santa Monica, CA (US)

(72) Inventors: Yuncheng Li, Los Angeles, CA (US); Linjie Yang, Los Angeles, CA (US); Ning Zhang, Los Angeles, CA (US); Zhengyuan Yang, Rochester, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,384

(22) Filed: Oct. 22, 2021

(65) Prior Publication Data
US 2022/0044010 A1 Feb. 10, 2022

Related U.S. Application Data

(63) Continuation of application No. 16/450,376, filed on Jun. 24, 2019, now Pat. No. 11,182,603.
(Continued)

(51) Int. Cl.
*G06V 40/10* (2022.01)
*G06F 17/15* (2006.01)
(Continued)

(52) U.S. Cl.
CPC ........... *G06V 40/107* (2022.01); *G06F 17/15* (2013.01); *G06N 3/04* (2013.01); *G06T 7/136* (2017.01)

(58) Field of Classification Search
CPC ...... G06V 40/107; G06V 40/10; G06F 17/15; G06N 3/04; G06N 3/0454; G06N 3/08; G06T 7/136; G06T 2207/20081; G06T 2207/20084; G06T 2207/30196; G06T 7/11; G06T 7/174
See application file for complete search history.

(56) References Cited

U.S. PATENT DOCUMENTS

| 2008/0101653 A1* | 5/2008 | Wang | G06K 9/6297 |
| | | | 382/103 |
| 2010/0303289 A1* | 12/2010 | Polzin | G06V 20/00 |
| | | | 348/135 |

(Continued)

OTHER PUBLICATIONS

"U.S. Appl. No. 16/450,376, Non Final Office Action dated Mar. 23, 2021", 13 pgs.
(Continued)

*Primary Examiner* — Amandeep Saini
(74) *Attorney, Agent, or Firm* — Schwegman Lundberg & Woessner, P.A.

(57) ABSTRACT

Segmentation of an image into individual body parts is performed based on a trained model. The model is trained with a plurality of training images, each training image representing a corresponding training figure. The model is also trained with a corresponding plurality of segmentations of the training figures. Each segmentation is generated by positioning body parts between defined positions of joints of the represented figure. The body parts are represented by body part templates obtained from a template library, with the templates defining characteristics of body parts represented by the templates.

20 Claims, 13 Drawing Sheets

Related U.S. Application Data

(60) Provisional application No. 62/725,897, filed on Aug. 31, 2018.

(51) Int. Cl.
*G06T 7/136* (2017.01)
*G06N 3/04* (2023.01)

(56) References Cited

U.S. PATENT DOCUMENTS

| | | | |
|---|---|---|---|
| 2011/0228976 A1* | 9/2011 | Fitzgibbon | G06V 10/774 |
| | | | 382/103 |
| 2012/0087545 A1 | 4/2012 | Perlin et al. | |
| 2019/0244407 A1* | 8/2019 | Wiesel | G06V 40/103 |

OTHER PUBLICATIONS

"U.S. Appl. No. 16/450,376, Notice of Allowance dated Jul. 19, 2021", 10 pgs.
"U.S. Appl. No. 16/450,376, Response filed Feb. 4, 2021 to Restriction Requirement dated Dec. 11, 2020", 7 pgs.
"U.S. Appl. No. 16/450,376, Response filed Jun. 22, 2021 to Non Final Office Action dated Mar. 23, 2021", 10 pgs.
"U.S. Appl. No. 16/450,376, Restriction Requirement dated Dec. 11, 2020", 6 pgs.

* cited by examiner

| Method | Sup. | Training set | mIOU | Bg | Head | Torso | U arm | L arm | U leg | L leg |
|---|---|---|---|---|---|---|---|---|---|---|
| DeepLab | Fully | Pascal | 63.64 | 94.9 | 84.6 | 66.9 | 56.0 | 54.2 | 45.5 | 43.4 |
| WSHP | Semi | MPI+Pascal | 67.60 | 97.7 | 87.2 | 72.3 | 57.1 | 56.2 | 52.4 | 50.4 |
| Our Method | Semi | COCO+Pascal | 68.50 | 95.9 | 85.7 | 70.6 | 61.0 | 59.4 | 53.0 | 53.8 |
| Our Method | Weakly | COCO+Pascal | 63.25 | 95.8 | 82.5 | 63.8 | 48.9 | 49.9 | 49.7 | 52.1 |

FIG. 11

WEAKLY SUPERVISED SEMANTIC PARSING

CROSS-REFERENCE TO RELATED APPLICATIONS

This application is a continuation of U.S. patent application Ser. No. 16/450,376, filed on Jun. 24, 2019, which claims the benefit of priority to U.S. Provisional Patent Application Ser. No. 62/725,897, filed on Aug. 31, 2018, the entireties of each of which are hereby incorporated by reference herein.

TECHNICAL FIELD

The present disclosure generally relates to the technical field of image recognition. In particular, the disclosure relates to labeling of body parts of a figure represented by an electronic image.

BACKGROUND

Semantic parsing maps a naturally occurring object into a formal representation of the object's meaning. For example, natural language processing may use semantic parsing to map components of a sentence into nouns, verbs, and adjectives. Methods for automatically learning semantic parsers from annotated corpora using inductive logic programming and other learning methods have been developed. Methods have also been developed to learn semantic lexicons from semantically annotated objects and are a source of knowledge for semantic parsing.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 11 is a table showing results of some of the embodiments disclosed and compared to other methods.

DETAILED DESCRIPTION

Figure 1:
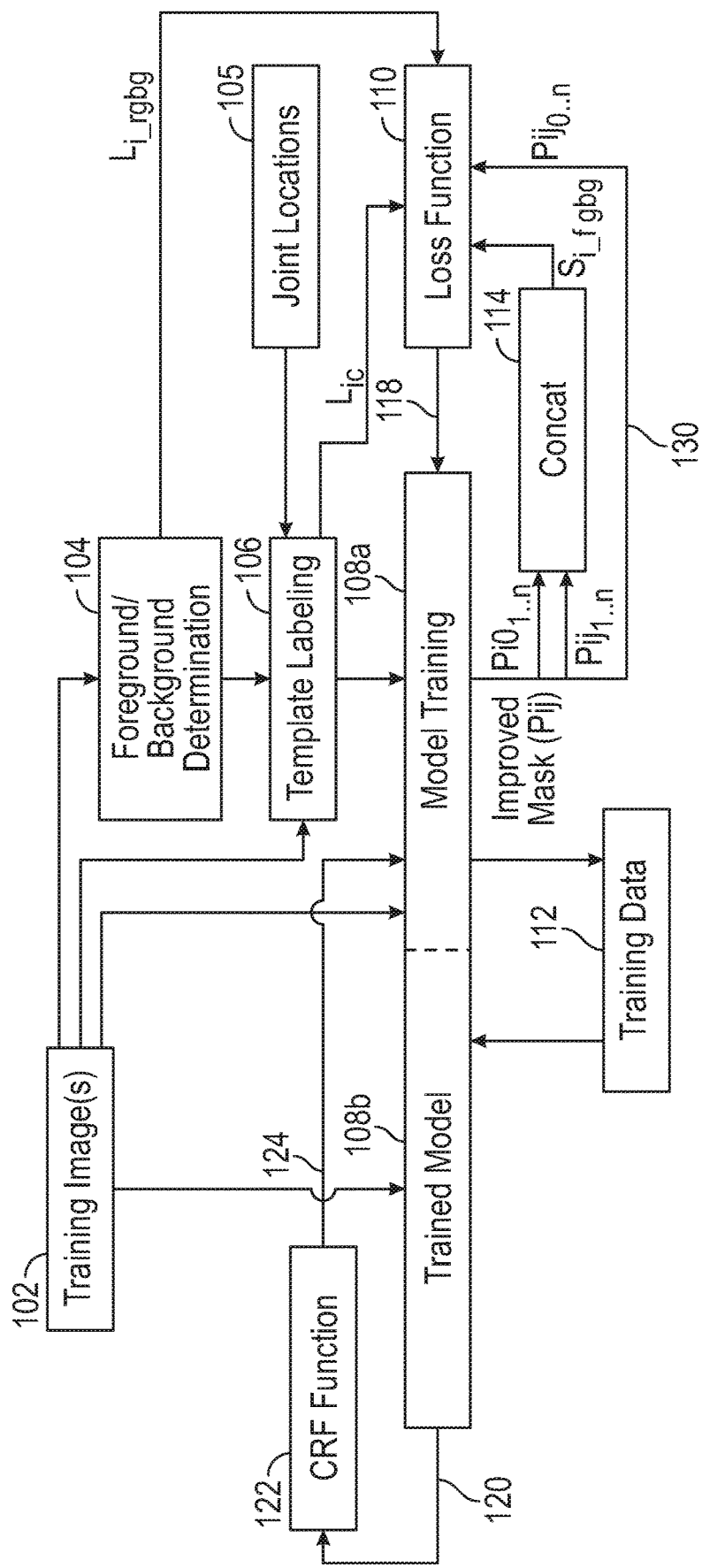
FIG. 1 is an overview diagram showing data flows for a method of training and using a neural network in accordance with some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Semantic parsing segments objects into their semantic parts. For example, parsing of a human figure may segment the human figure into arms, legs, torso, and head. Supervised parsing may include manual labeling of segments of a figure represented by an image. For example, relatively complete boundaries of arms, legs, heads, and torsos as well as other body parts may be manually labeled by a human operator. These manually labeled segments may then be used to train a neural network. The neural network may then, based on the training, label additional figure representations.

The disclosed embodiments provide for a more efficient method of training a neural network to perform sematic parsing. As discussed above, supervised parsing may include collecting input that labels segments of a figure represented by an image. For example, the labels may identify one or more of arms, legs, torso, and/or head of the figure. The labeling may be accomplished manually by humans viewing the figures and entering input that provides the labels. This manual labeling is expensive, time consuming, and may be prone to error. The disclosed embodiments dispense with this expensive and unreliable process and instead derive labels for segments of a figure using predefined templates. The templates may be positioned on the figure based on positions of joints of the figure. In some aspects, the positions of the joints may be provided via a manual process. For example, figures may be displayed to a human operator, with the operator indicating, via a user interface of a computer, locations on the figure of joints (including one or more of elbows, knees, wrists, ankles, shoulders, hips, neck, and other joints). While the locations of joints are provided, there is no indication of particular segments provided. For example, the human operator would not indicate a location of a forearm, head, leg, or torso.

After the locations of the joints are identified, the body part templates may be positioned between the identified joints on the figure to generate an initial segmentation for the figure. This initial labeling of figure body parts may then be provided to a model (e.g., based on a neural network) to train the model. This process may be performed for several images representing several figures. The multiple images and initial segmentations provide a rudimentary set of training data for the model.

Once the model is trained, the model is used to update each of the segmentations used in the training. For example, an initial segmentation for a figure, indicating body part positions based on the templates, is updated to indicate new body part positions via the trained model.

In some embodiments, these updated segmentations may then be provided to a conditional random field (CRF) model, which may further refine the updated segmentations. The model may then be reinitialized to remove the original training data that was based on the body part templates. The model may then be retrained based on the refined segmentations provided by the CRF model. This process may continue until a termination condition is reached, such as a difference between successive iterations of the segmentations being lower than a threshold. The most recently trained model may then be used to segment figures represented by one or more new images.

In some embodiments, a similar process may be used to segment facial features, perform hand parsing or general part parsing. For example, in a weakly supervised face parsing task, a sparse set of point facial landmarks are adopted as supervision. The landmarks on eyes, eras, brows, nose and mouth provide the basic structure of the facial parts but contain no detailed shape information for each part. Similar to body part parsing, the landmarks are converted to landmark face templates by drawing polygons on point locations. The facial landmarks annotations are used to train the face parsing model. The face parsing model is then used to estimate the detailed shape information for each part of the face.

Figure 2:
FIG. 2 shows an example of a training image in accordance with some embodiments.

FIG. 1 is an overview diagram showing data flow 100 for a method of training and using a neural network. The data flow 100 begins at the top left with a set of training images 102. Each of the training images 102 may represent a figure that can be segmented into component parts. In some aspects, each figure represented by the training images 102 represents a human figure. However, other types of figures are contemplated, such as a human face, a human hand, and, in some aspects, the images may represent figures of other animals, such as lions, tigers, or bears. An example of a training image 102 is illustrated in FIG. 2. Use of the term "figure" within this disclosure is intended to describe an object having multiple parts or segments. The multiple parts or segments of the figure may be identified by embodiments of this disclosure and labeled as such. While human or other animal figures are described above, the embodiments of this disclosure could also be applied to other figures having parts or components with defined boundaries between these parts or components. The defined boundaries between parts might be manually labeled, similar to how joints are manually labeled in some embodiments of this disclosure, and then a model trained to identify where the particular parts are located relative to the identified boundaries, in a manner consistent with the disclosure.

Figure 3:
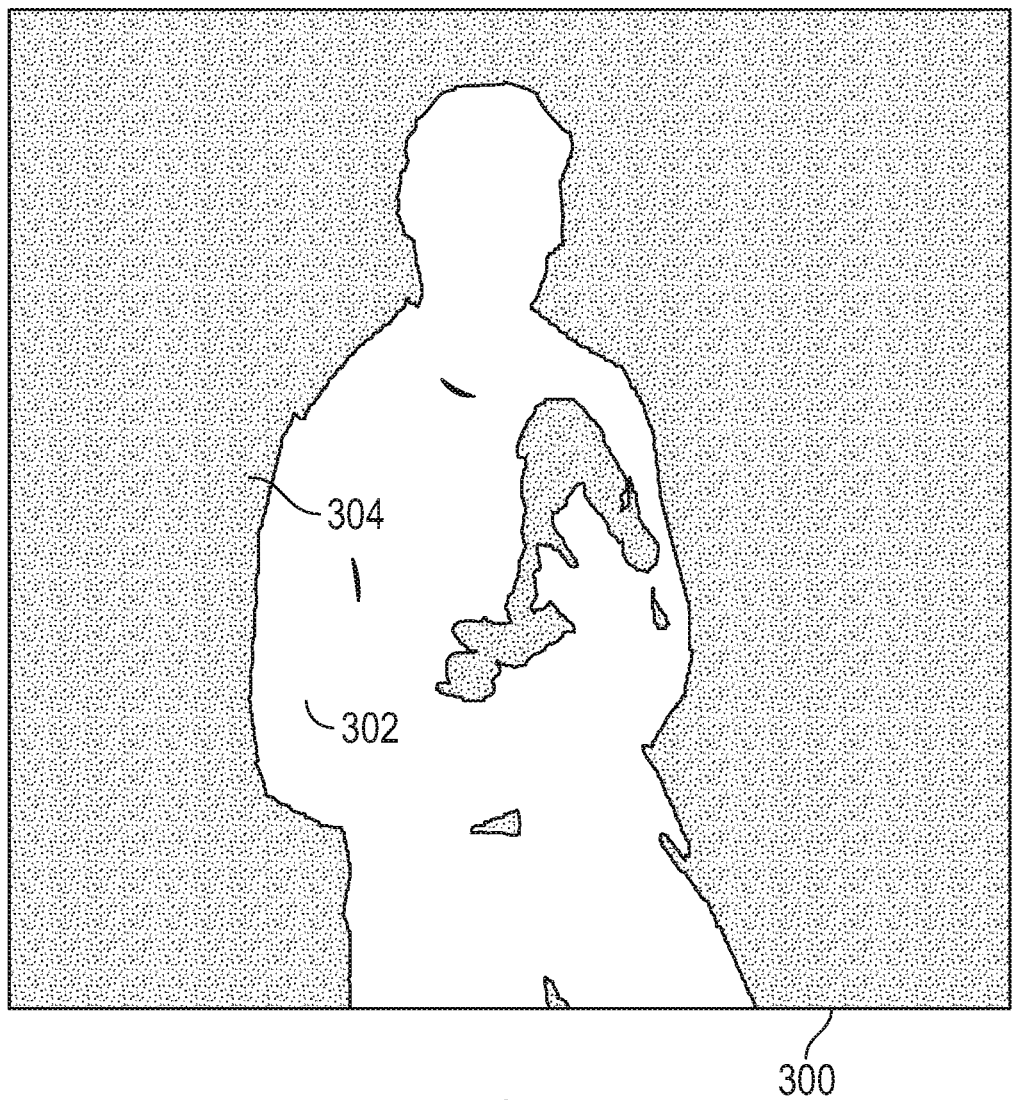
FIG. 3 shows an example of a mask of a training image indicating a foreground portion and a background portion in accordance with some embodiments.

The training images 102 are provided to a foreground/background determination component 104 that provides foreground/background indications for the training images 102 to a template labeling component 106. An example of a mask 300 identifying foreground 302 (in white) and background 304 (in black) is illustrated in FIG. 3. In some aspects, the template labeling component 106 may not produce a white and black image as in the example of FIG. 3, but may instead generate a set of probabilities indicating whether each portion (e.g., pixel) in a training image is part of a background of the image and/or part of a foreground of the image.

The template labeling component 106 also receives indications of locations of joints 105 of the figures represented by the training images 102. As discussed above, in some aspects, the locations of joints 105 may be generated via a manual process. For example, some embodiments may include displaying a training image on an electronic display for viewing by a human operator. The human operator may then enter input, via a user interface presented on the display, the input indicating one or more locations of joints within the training image and/or facial landmarks. In some aspects, the joint locations and/or facial landmarks may be automatically identified, for example, via a separate neural network not discussed as part of this disclosure.

The locations of the joints 105 may indicate one or more of locations of elbows, knees, hips, angles, shoulders, neck, or other joint locations of figures represented by the training images 102. The locations of joints 105 do not identify locations of particular body parts, such as arms, legs, a head, or a torso.

Instead, the template labeling component 106 may determine an initial segmentation defining locations of body part segments for the figures represented by the training images 102. The template labeling component 106 may, for example, select templates from a template library. The template library may provide a set of templates, and indicate, for each template, types of joints that may be positioned at various positions (e.g., opposing ends) of each segment. Thus, for example, a template for an upper arm may indicate the template is positioned between a shoulder and an elbow. The template labeling component 106 may then scale and/or rotate the templates as needed to fit the templates to an appropriate position within the foreground portion of the image identified by the foreground/background determination component 104. In an embodiment, the template for each part may be a simple ellipse or polygon without any fitting parameters. The length, location, and angle of the generated templates are calculated based on the related joints.

Figure 4:
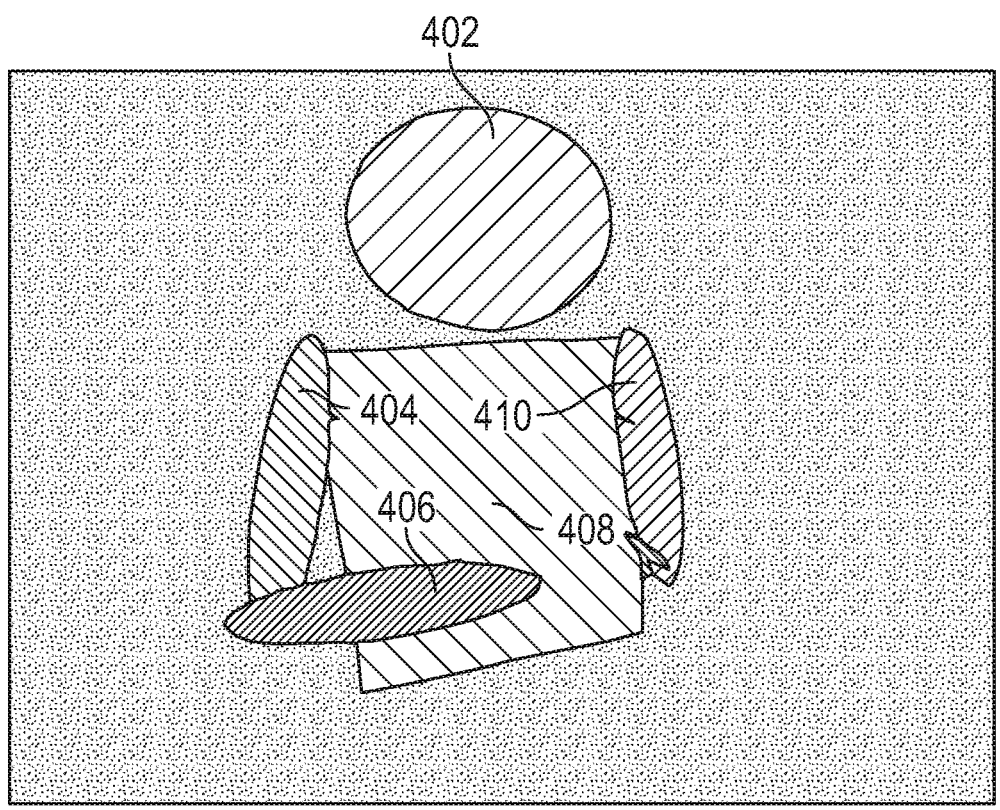
FIG. 4 is a visual representation of an image segmentation in accordance with some embodiments.

An example of segmentation generated by the template labeling component 106 is illustrated in FIG. 4. As shown, the segmentation defines positions of a head 402, upper arm 404, lower arm 406, torso 408, and upper arm 410. The resulting template-based segmentation generated by the template labeling component 106 is then provided to a model training 108a.

Figure 5:
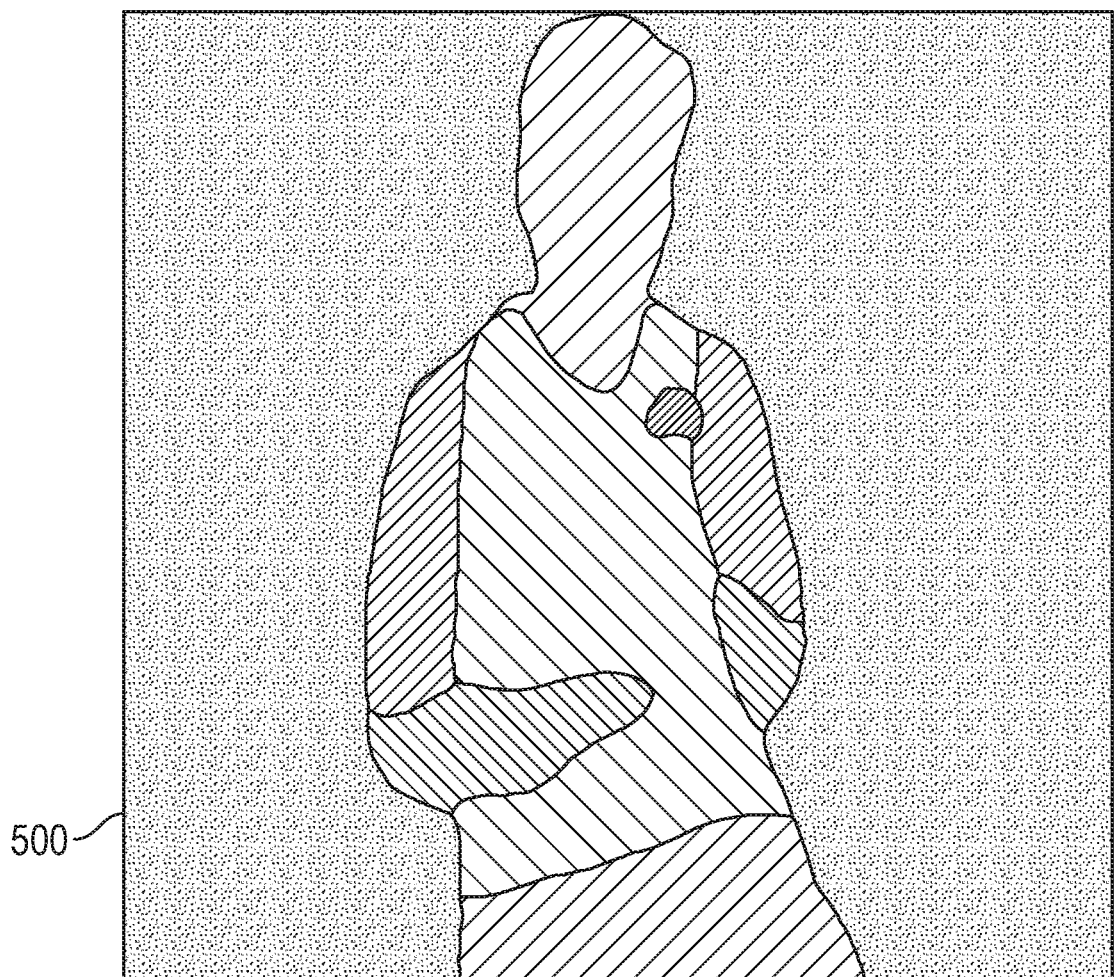
FIG. 5 is a visual representation of a revised image segmentation in accordance with some embodiments.

The model 108 also receives a copy of the training image corresponding to the template-based segmentation. Based on these inputs, the model 108 produces a revised segmentation of the figure represented by the training image. A visual representation of a revised segmentation is shown in FIG. 5. While FIG. 5 shows the revised segmentation visually, the revised segmentation in some embodiments may not take the form of a visual image, but may instead comprise a set of probabilities, each probability indicating whether a corresponding portion of the image is included in a particular body. An example segmentation is discussed below with respect to table 630 of FIG. 6. The segmentation may indicate probabilities that a portion of an image (e.g., a pixel within the image) is part of the head, neck, upper arm, lower arm, upper leg, lower leg, torso, or other body parts. In some aspects, each portion may consist of a single pixel. In other aspects, each portion may include multiple pixels.

This revised segmentation generated by the model 108 is provided to a loss function 110, which compares the revised segmentation to the segmentation generated by the template labeling component 106 to determine a loss. The model 108 then generates model training data 112 based on the training image, template-based segmentation, revised segmentation, and loss value. FIG. 1 shows information flows $L_{ic}$, $L_{i\_rgbg}$, $P_{ij}$, $S_{i\_fgbg}$, which will be discussed below with respect to FIG. 10 and Equation 1.

The process illustrated in FIG. 1 may be repeated for multiple training images 102, with the model 108 aggregating the training provided by the training images 102 into the training data 112.

After this first training, each of the training images 102 may be provided a second time to the trained model 108b, with the model 108b generating a new segmentation 120 for the training images. This new segmentation may benefit from the accumulated training the model 108 received from all of the images in the set of training images 102. This accumulated training may allow the model 108 to provide a more accurate segmentation of a training image than it was able to generate during the "first pass" through the model 108, before the model 108 had been "adequately" or "completely" trained.

The new segmentations for the training images 102 may be provided to a CRF function 122, which may further refine this segmentation as refined segmentation 124.

A second round of training of the model 108 may then begin. In the second round, the training images 102 are again provided to the model 108. Instead of the template labeling component 106 providing segmentation of the training images 102 in the second round, the segmentation for training the model 108 is provided based on the refined segmentation provided by the CRF function 122, or optionally, based on the new segmentations 120 provided by the trained model 108b in the previous round of training. In some aspects, the second round of training may not be based on training data 112 developed during the previous round. In these aspects, a second model may be trained. Alternatively, the model used in the previous round of training may be reinitialized or to otherwise "forget" any training data from previous rounds.

After the second round of training, the training images 102 may again be provided to the trained model 108b, generating new segmentations 120, which may again be provided to a CRF function 122 to generate further refined segmentations 124.

One or more of a third, fourth, fifth, sixth or more rounds of training could then be performed in a similar manner to the second round, with each successive round of training based on the training images 102 and segmentations 120 produced by the model 108 after the previous round of training. Again, the model 108 may be reinitialized before the next round of training begins.

This process may repeat until a termination condition is reached. For example, when improvements to the segmentations across iterations transgress a threshold, the model 108 may be considered sufficiently trained, and may then be used to generate segmentations for new images not included in the training images 102.

Each of the foreground/background determination components 104, template labeling component 106, model 108, concatenation 114, loss function 110, and CRF function 122 may represent instructions stored in a memory. In some embodiments, these instructions are included in instructions 1310.

Figure 6:
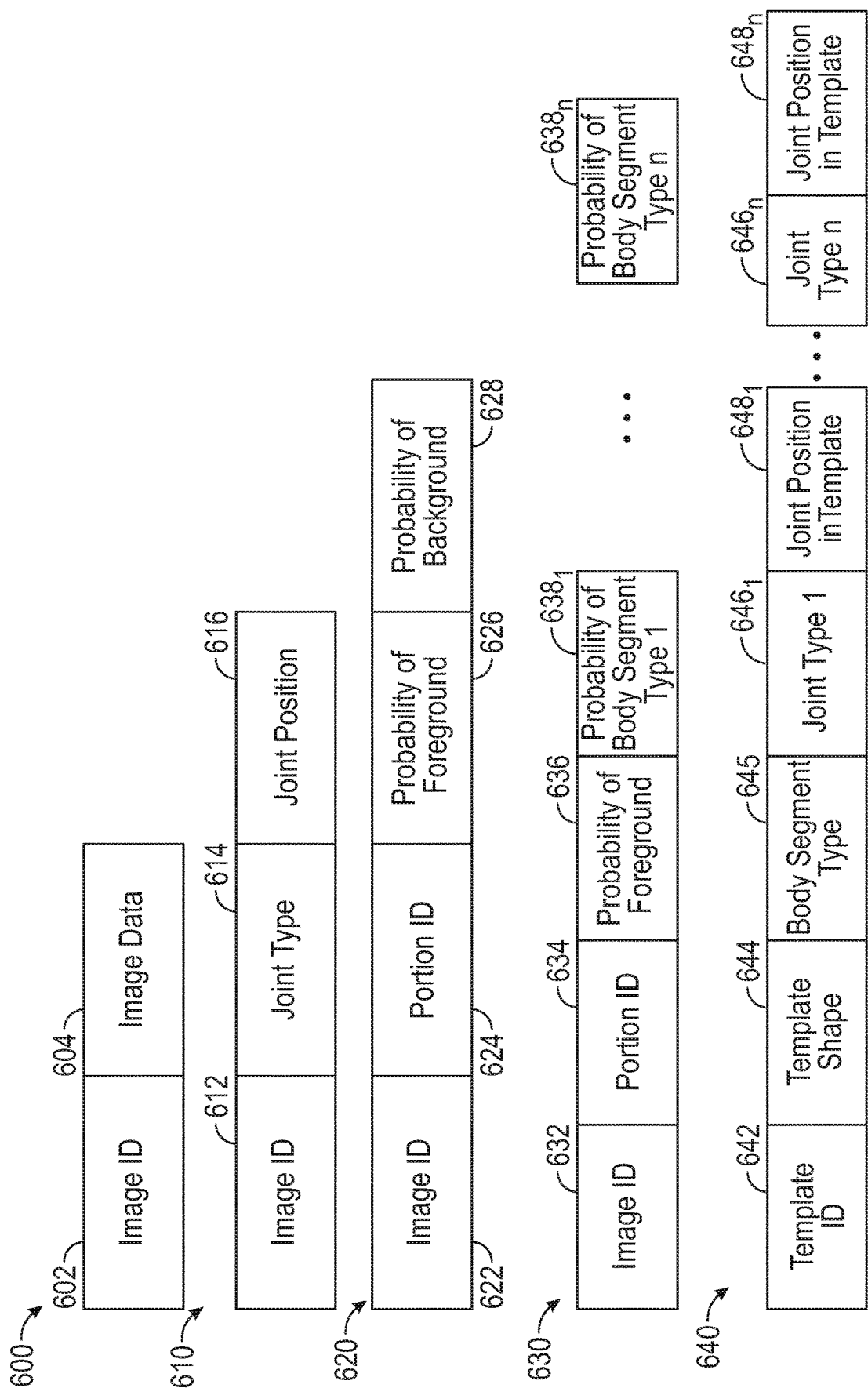
FIG. 6 is an example of data structures, one or more of which may be implemented by at least some of the disclosed embodiments.

FIG. 6 shows an example of data structures, one or more of which may be implemented in at least some of the disclosed embodiments. FIG. 6 shows a training image table 600, joint position table 610, image foreground table 620, and an image segmentation table 630. In some aspects, each of the tables discussed below may be relational database tables stored in a relational database. Thus, in these aspects, the collection of fields identified in each of the tables represents a "row" in the table of the relational database, with an implementation generally including multiple rows in each table. In some other aspects, the tables discussed below are not necessarily tables in a database, but may instead represent memory structures that may be stored in an electronic memory or stable storage. The memory structures may include multiple records or structures including one or more of the fields identified in the tables. The memory structures may then be referenced by embodiments discussed herein.

Each entry or row in the training image table 600 stores a training image 102. The training image table 600 includes an image identifier 602 that uniquely identifies the training image 102 and image data 604 defining the training image 102.

Each entry or row in the joint position table 610 stores an imaging identifier 612, joint type 614, and joint position 616. The image identifier 612 may be cross referenced with the image identifier 602. The joint type 614 defines a type of joint identified by a particular entry or row in the joint position table 610. The type of joint may identify whether the joint is an elbow, knee, angle, hip, shoulder, or other type of joint. The joint position 616 identifies a position within the image identified by the image identifier 612 of the identified joint. The joint position 616 may identify a single position for the joint, such as a single pixel within the image representing the position of the joint, or a region of the image representing the position of the joint. In some aspects, the joint position table 610 may be equivalent to the positions of joints 105 discussed above with respect to FIG. 1.

Each entry or row of the image foreground table 620 includes an image identifier 622, portion identifier 624, a probability that the portion is foreground 626, and a probability that the portion is background 628. The image identifier 622 may be cross referenced with image identifiers 602 and 612. Both probabilities 626 and 628 refer to portion identifier 624. In some aspects, the probabilities 626 and 628 may add up to one (1). In some aspects, the image foreground table 620 includes only one of the probabilities 626 or 628. In these embodiments, the missing probability may be inferred. In some aspects, information of the image foreground table 620 may be determined by the foreground/background determination component 104 discussed above with respect to FIG. 1. In some aspects, the portion identifier 624 may identify a single pixel within the image represented by the image identifier 622. In some other aspects, the portion identifier 624 may identify a region of the image that includes multiple pixels.

Each entry or row in the image segmentation table 630 includes an image identifier 632, portion identifier 634, a probability that the portion is foreground 636, and one or more probabilities $638_1$-$638_n$ that the portion is a particular body segment type. In some aspects, the field 636 may represent a probability that the portion is background instead of a foreground. In some embodiments, image segmentation table 630 may include a probability 638 for each body segment type possibly indicated in the body segment type field 645, discussed below. In other words, if the body segment type field 645 may indicate one of n body segment types, image segmentation table 630 may indicate n probabilities of whether the portion is a particular one of the n body segment types.

Each entry or row in the template table 640 or template library 640 includes a template identifier 642, template shape field 644, body segment type field 645, and pairs of fields $646_{1-n}$ and $648_{1-n}$ defining a joint type and a joint position within the template. The template identifier 642 uniquely identifies a particular template. The template shape field 644 defines a shape of the template. For example, if the template shape is an ellipse, the template shape field 644 may define a ratio between a first dimension of the ellipse and a second dimension of the ellipse. Other template shapes may also be defined by the template shape field 644. The body segment type field 645 defines a type of body segment defined by the template. For example, the body segment type field 645 may define whether the template is a lower leg, upper leg, head, upper arm, lower arm, torso, or other body segment. The body segment type field 645 may be used as an index to identify a probability in the segmentation table 630 that a particular portion identifier 634 of an image identified via image identifier 632 is included in a body segment of the type indicated by field 645.

The joint type fields $646_{1-n}$ define types of joints that may be at an edge of a body segment defined by the template identified via template identifier 642. For example, the joint type fields $646_{1-n}$ may identify whether the joint is a shoulder, elbow, knee, angle, hip or other joint. The joint position fields $648_{1-n}$ define positions within the template for the joint identified via joint type fields $646_{1-n}$.

Any of the image identifiers referenced in FIG. 1, including one or more of the image identifier 602, 612, 622, 632 may be cross referenced with each other.

Figure 7:
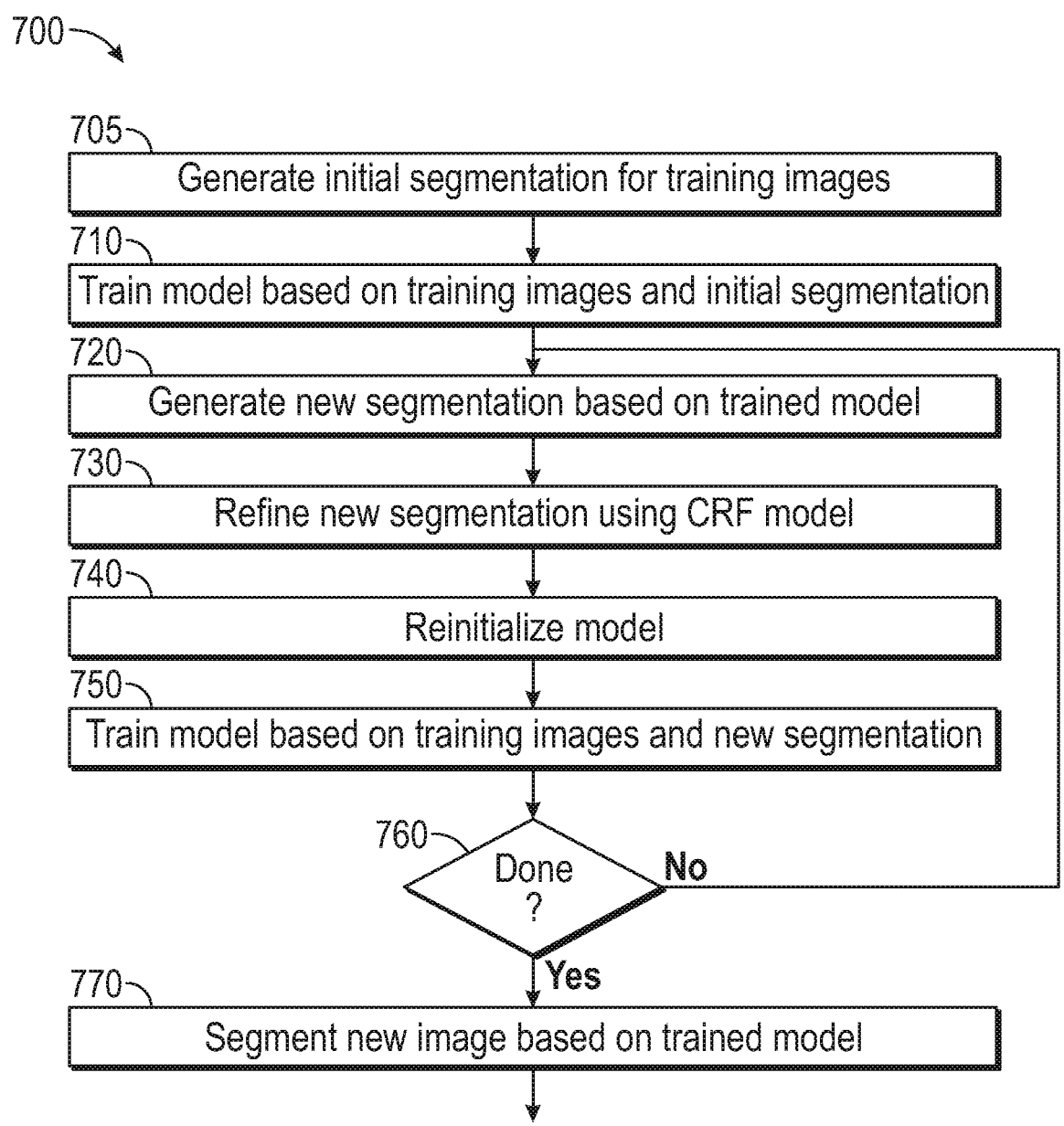
FIG. 7 is a flowchart of an example method of training a model and then applying the model to segment an image in accordance with some embodiments.

FIG. 7 is a flowchart of a method of training a model and then applying the model to segment an image. One or more functions discussed below with respect to process 700 and FIG. 7 may be performed by the machine 1300, also discussed below. For example, in some aspects, instructions 1310 may configure a hardware processor 1304 to perform one or more of the functions discussed below with respect to FIG. 13. In some aspects, the process 700 may be performed by an application 1216, as discussed below with respect to FIG. 12.

In operation 705, initial segmentations are generated for a set of training images (e.g., training images 102). As discussed above, the initial segmentations may identify body part positions for figures represented by the training images. A training image may represent a figure, such as a human figure or in some aspects, some other animal figure, such as a horse, cow, pig, or other animal. An example training image 102 is illustrated in FIG. 2. As discussed above, and in more detail in FIG. 7 below, the initial segmentation may be generated by fitting body part templates in relation to joint positions within the figure. The joint positions may be identified manually in some aspects, or in some aspects, via a separate machine learning model. In some aspects, the initial segmentations may take the form of the segmentation table 630, discussed above with respect to FIG. 6. For example, each segmentation may include a set of probabilities, each indicating whether a particular portion of a training image is part of a particular type of body segment, such as an upper arm, lower arm, upper leg, lower leg, head, torso, or other body segment.

In operation 710, a model is trained based on the initial segmentation of the training images. Thus, operation 710 may include providing the model with a plurality of training images, and a corresponding plurality of segmentations of the training images. The model may generate a refined segmentation based on the input, and a loss may be determined based on differences between the initial segmentation and the refined segmentation generated by the model. The model may then store data relating the training image, initial segmentation, refined segmentation, and loss information in a set of model data.

In operation 720, a new segmentation for each of the training images may be generated by the trained model. For example, each training image may be provided to the model, and the model, relying on training data generated in operation 710, may generate a new segmentation based on the training data and the training image.

In operation 730, the new segmentation may be refined using a CRF model. In some aspects, a fully connected CRF may be used. Some embodiments may utilize the CRF model described in Philipp Krähenbühl and Vladlen Koltun, *Efficient Inference in Fully Connected CRFs with Gaussian Edge Potentials*, Advances in Neural Information Processing Systems 24, pp. 109-117 (2011), the contents of which are hereby incorporated by reference in its entirety.

In operation 740, the model is reinitialized. Reinitializing the model may include deleting the training data (e.g., training data 112). Alternatively, a new model may be employed. In other words, the training data from a previous iteration of training may not be deleted, but it may not be used in further operations of the process 700.

In operation 750, the reinitialized model is trained based on the training images and the new (refined by operation 730 or in some aspects, not refined by operation 730) segmentations generated in operation 720. Note the new segmentations were produced by a trained model in operation 710. Decision operation 760 evaluates whether the process 700 is complete. In some aspects, operation 760 may compare differences between new segmentations generated by successive iterations of process 700. If the differences are determined to meet a completion criterion, then decision operation 760 may conclude the training process is complete. Otherwise, a new set of segmentations is generated by operation 720 and the training process continues as discussed above. In some aspects, a completion criterion evaluated by decision operation 760 may be met if differences between successive segmentations are smaller than some defined threshold. For example, in some aspects, decision operation 760 may evaluate a number of pixels that changed classification between two successive iterations of the segmentation are below a threshold value. If the number is below the threshold, then the completion criterion for operation 760 may be met.

If the training process is complete, and decision operation 760 concludes same, process 700 moves to operation 770, which segments a new image based on the trained model. Thus, operation 770 may include providing a new image, which is an image not used in training, to the model. The model may generate a segmentation for the image (e.g., image segmentation table 630). The segmentation may then be used in a number of different ways depending on embodiments. In some aspects, the segmentation may be written to an output device. In some aspects, the segmentation may be used to position articles of clothing on a figure represented by the new image, for example, to facilitate an ecommerce experience. In some aspects, this may lead to an ecommerce purchase transaction of an article of clothing that was positioned based on the new segmentation. In some aspects, selective image editing techniques may be applied to particular segments identified in the image. For example, certain image enhancements may be applied to a head of a figure represented by the new image, but may not be applied to other segments of the figure. In some aspects, animation of a figure represented by the new object may be accomplished based on the segmentation. For example, in some aspects, arm segments and/or leg segments may be repositioned in a series of images generated from the new image that demonstrate the figure performing certain actions such as running or moving their arms.

Figure 8:
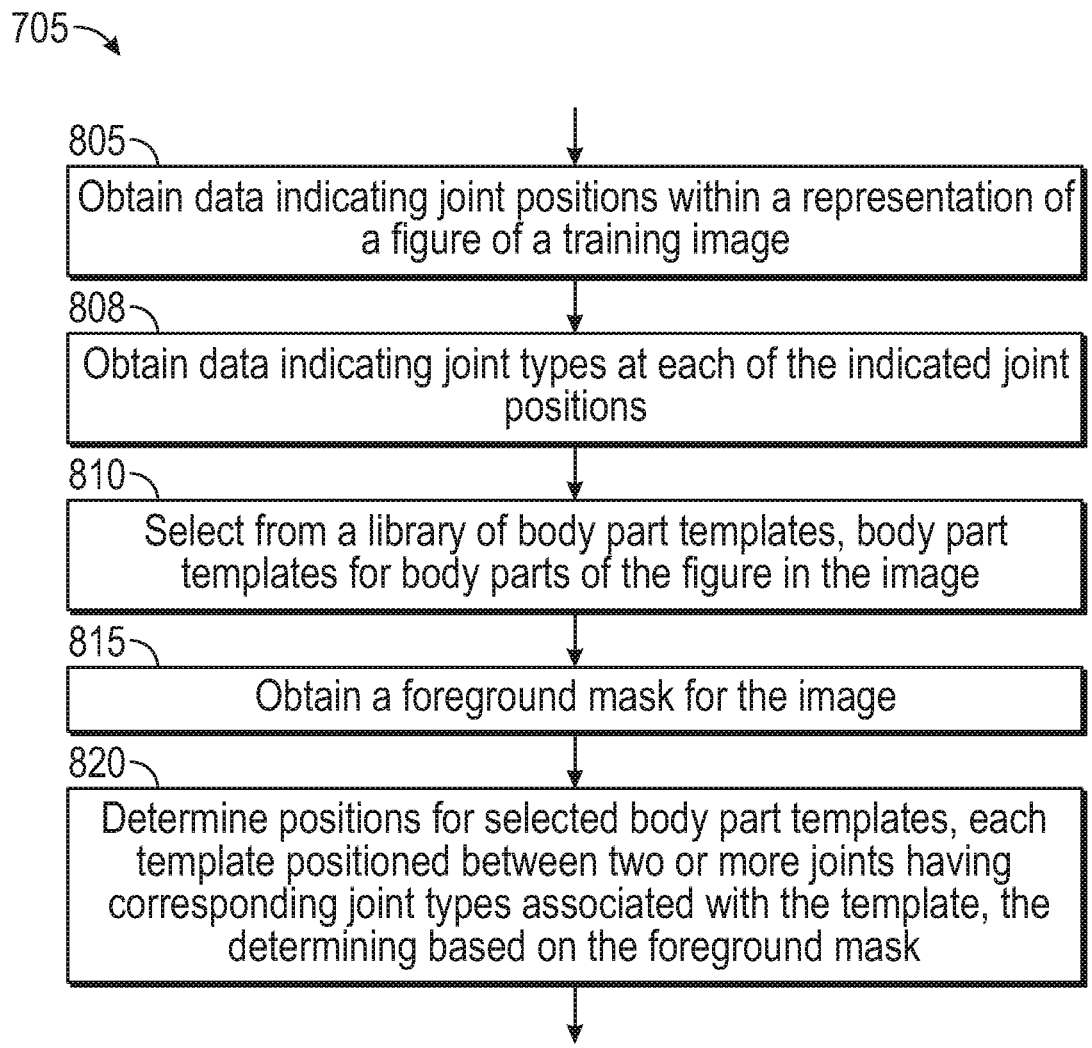
FIG. 8 is a flowchart of an example method for generating an initial segmentation of a figure represented by an image in accordance with some embodiments.

FIG. 8 is a flowchart of an example method for generating an initial segmentation of a figure represented by an image. FIG. 8 illustrates one embodiment of operation 705, discussed above with respect to FIG. 7. One or more functions discussed below with respect to operation 705 of FIG. 8 may be performed by the machine 1300, also discussed below. For example, in some aspects, instructions 1310 may configure a hardware processor 1304 to perform one or more of the functions discussed below with respect to FIG. 8. In some aspects, the operation 705 may be performed by an application 1216, as discussed below with respect to FIG. 12.

In operation 805, data indicating joint positions are obtained. The joint positions are within a figure represented by a training image. For example, each joint position may indicate one or more pixels within the training image that represent a particular joint of the figure. The type of joint located at the indicated position may also be obtained in an operation 808. In some aspects, each joint position obtained in operation 805 may include one or more fields of the joint position table 610.

In operation 810, body part templates are selected from a template database based on the obtained joint positions. Each body part template in the template database may be associated with one or more joint types. For example, an upper arm template may be associated with a shoulder joint and an elbow joint. A lower leg template may be associated with a knee joint and an ankle joint. In some aspects, body part templates may include one or more of the fields discussed above with respect to the template table or template library 640. Thus, operation 810 may select a particular template by matching one or more joint types of the joint position table 610 with one or more templates identified in the template table 640 via the joint type 614 field(s) and joint type field(s) $646_{1-n}$.

In operation 815, a foreground mask for the image is obtained. An example of a foreground mask is provided in FIG. 2 above. The foreground mask indicates pixels within the training image that are part of a foreground of the training image and/or pixels within a background of the training image.

In operation 820, positions for the selected body part templates are determined based on the joint positions, templates, and foreground mask. In some aspects, the body part templates may be positioned in the figure by aligning joint positions within the image (indicated by the joint position table 610 and joint position field(s) 616) with joint positions of equivalent joint types (e.g., 614=646) within the templates (indicated by the template table 640 and template 648). In some aspects, positioning of the body part templates may be limited to positions within the foreground of the image based on the foreground mask. One example embodiment of operation 820 is discussed in more detail with respect to FIG. 8 below. FIG. 4 shows an example of positioning body part templates within a foreground of an image.

Figure 9:
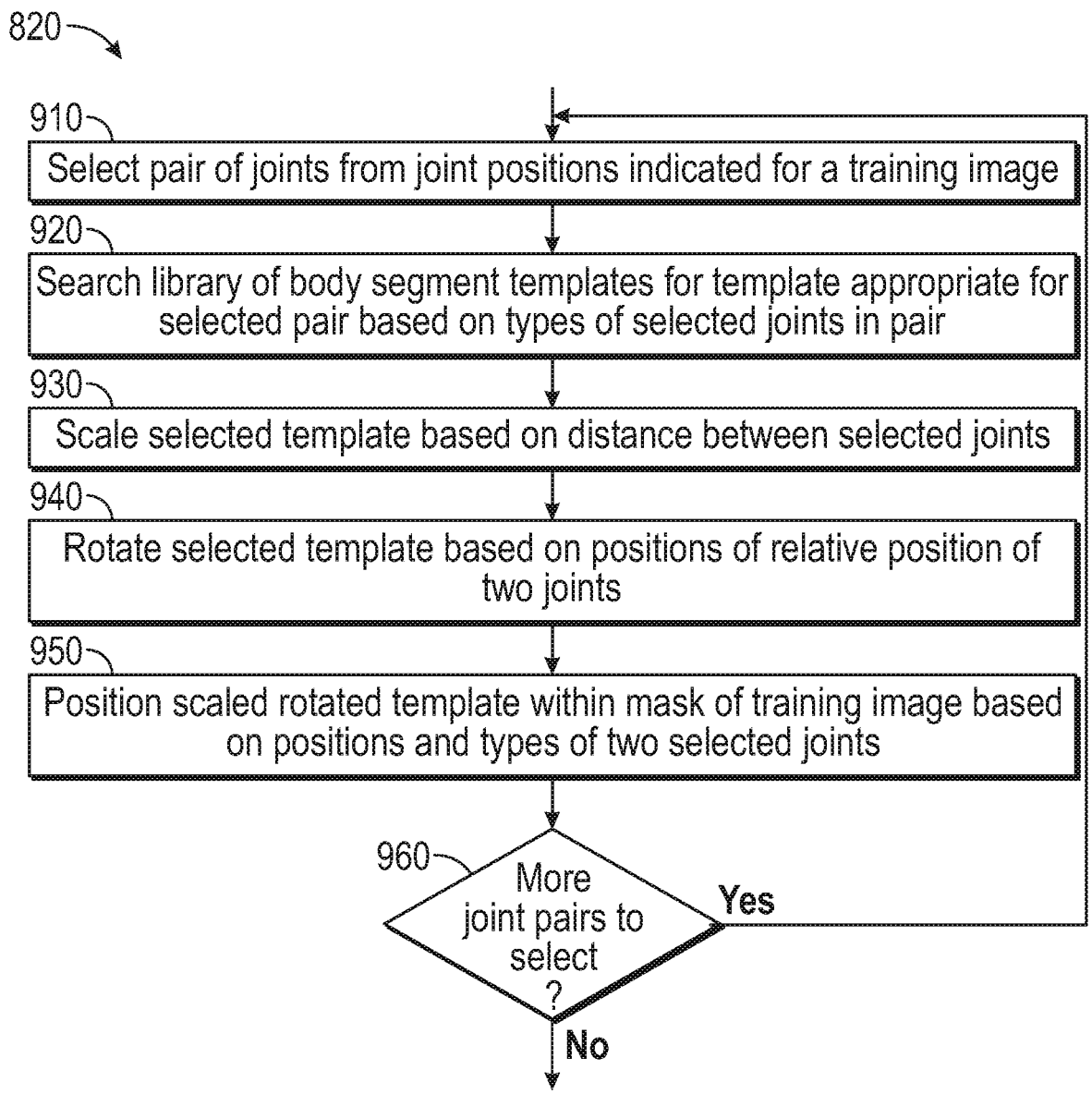
FIG. 9 is a flowchart of an example method for generating an initial segmentation of a figure represented by an image in accordance with some embodiments.

FIG. 9 is a flowchart of an example method for generating an initial segmentation of a figure represented by an image. One or more functions discussed below with respect to operation 820 and FIG. 9 may be performed by the machine 1300, also discussed below. For example, in some aspects, instructions 1310 may configure a hardware processor 1304 to perform one or more of the functions discussed below. In some aspects, the operation 820 may be performed by an application 1216, as discussed below with respect to FIG. 12.

In operation 910, a pair of joints is selected from a set of joint positions indicated for a training image. For example, in some aspects, operation 910 may select two joints indicated in the joint position table 610 for a particular training image indicated via image identifier 612.

In operation 920, a library of body segment templates is searched to identify a template for the selected pair based on a first joint type of a first joint of the selected pair and a second joint type for a second joint of the selected pair. For example, in some aspects, a template table (e.g., 640) may be searched to identify a template associated with the first and second joint types (e.g., via $646_{1-n}$).

In operation 930, the selected template may be scaled based on a distance between the selected pair of joints within the figure. For example, the distance may be determined based on a difference between a first joint position (e.g., 616 for the first joint) and a second joint position for the second joint (e.g., 616, different row in the joint position table but identifying the same image via 612). A baseline scale may be associated with each selected template. In some aspects, all templates have the same baseline scale, which may be predefined. In other aspects, a baseline scale may be independently indicated for each template. For example, in some of these aspects, the template shape field 644 may also indicate a baseline scale value for the template identified by the template identifier 642. Scaling the template may be based on the baseline scale of the template and the distance. In some aspects, scaling the template comprises generating data indicating a boundary of the template at the new scale.

In operation 940, the template is rotated based on the positions of the two joints. In some aspects, each template in the template library 640 may have the same baseline orientation. Alternatively, an orientation for each template may be independently indicated in the template library 640 (e.g., via template shape field 644). Operation 940 may rotate the template so as to orient the template such that the joint positions of the template (e.g., indicated by $648_{1-n}$) are oriented consistent with an orientation of positions of the pair of joints from operation 910 within the training image (indicated by 616 for each joint). Operation 940 may include rotating a template boundary defined in operation 930.

In operation 950, the template is positioned at a location within a mask of the training image based on the scaled and rotated template. Operation 950 may include determining a position of the boundary of the scaled and rotated template within the training image or mask of the training image such that joint positions of the template (e.g., indicated via $648_{1-n}$) overlap positions of the corresponding joints within the image (e.g., indicated via 616 for each joint). Note that in at least some aspects, positioning the template does not necessarily include moving a shape into any position. Instead, data defining a position of the template may be modified to represent the position. For example, operation 950 may generate or modify data similar in format to one or more fields included in the image segmentation table 630.

In operation 960, a determination is made as to whether more joint pairs remain to be selected. In response to determining that more joint pairs remain, the process proceeds to operation 910, otherwise the process ends.

Figure 10:
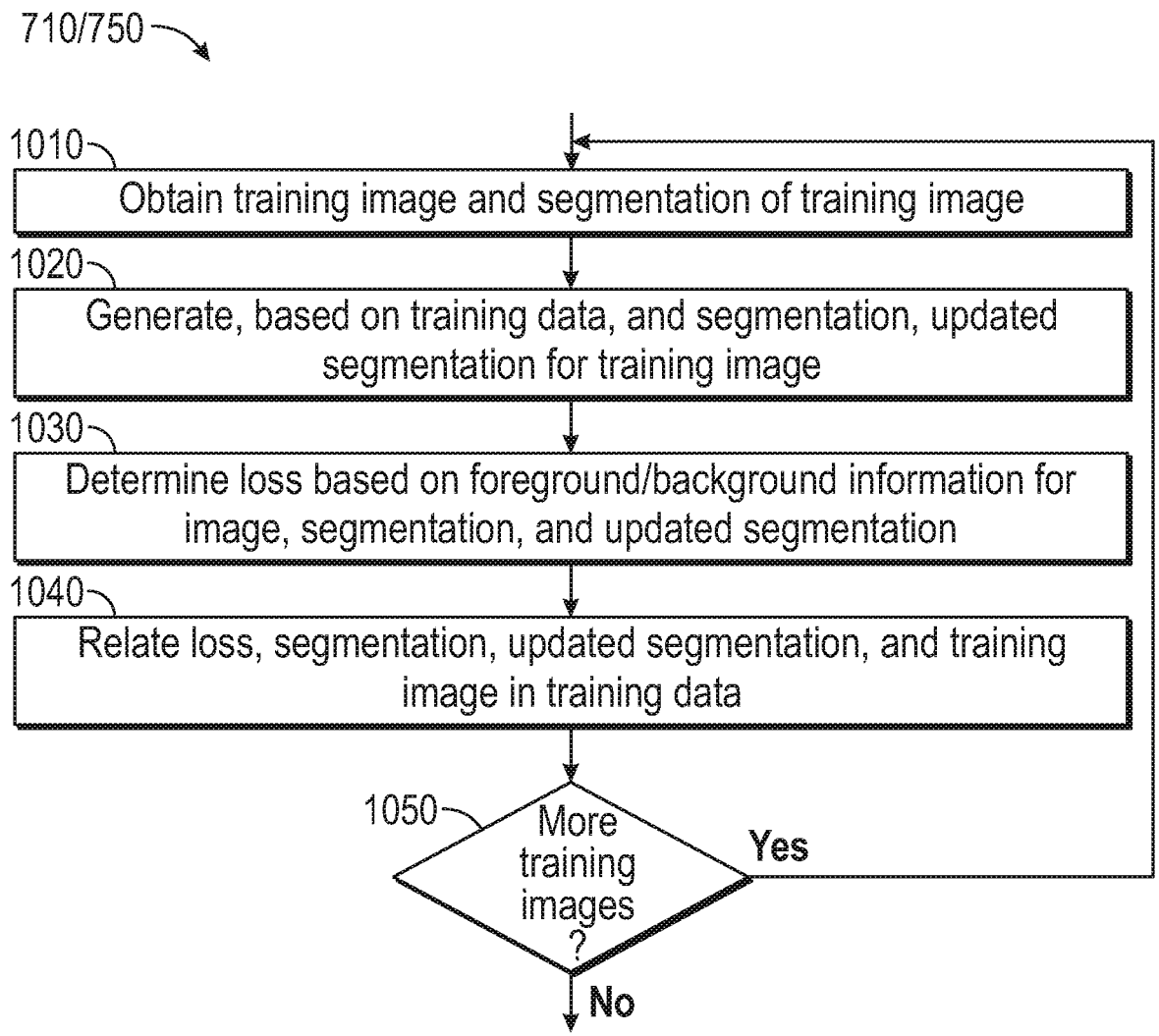
FIG. 10 is a flowchart of an example method for training a model in accordance with some embodiments, such as the model discussed with respect to FIG. 1.

FIG. 10 is a flowchart of an example method for training a model, such as the model 108, discussed above with respect to FIG. 1. Training of the model may generate training data 112, discussed above. FIG. 10 describes one embodiment of operations 710 and/or 750, discussed above with respect to FIG. 7 and process 700. One or more functions discussed below with respect to operation 710 and/or 750 and/or FIG. 10 may be performed by the machine 1300, also discussed below. For example, in some aspects, instructions 1310 may configure a hardware processor 1304 to perform one or more of the functions discussed below. In some aspects, the operation 710 and/or 750 may be performed by an application 1216, as discussed below with respect to FIG. 12.

In operation 1010, a training image (e.g., 102) and segmentation (e.g., 630) of the training image is obtained. In some aspects, the segmentation may be generated by operation 705, discussed above with respect to FIG. 7 and/or FIG. 8. In some cases, the segmentation may be generated by a model, such as the model 108, and/or as discussed above with respect to operation 720.

In operation 1020, an updated segmentation is generated. The update to the segmentation provided in operation 1010 is based on training data of the model and the training image.

In operation 1030, a loss is determined. The loss is determined based on the updated segmentation, the segmentation obtained in operation 710, and foreground/background information for the image. In some aspects, the loss may be determined via Equation 1 as described below:

$$\text{Loss} = L_{part} + L_{fg} \tag{1}$$

$$L_{fg} = \sum_{i \in I} \sum_{fgbg=0}^{1} CE(S_{i_{fgbg}}, L_{i_{fgbg}})$$

$$L_{part} = \sum_{i \in M \cup B} \sum_{c=0}^{6} CE(P_{ic}, L_{ic})$$

where:

CE is a cross entropy loss function. In some aspects, CE is defined as:

$$CE(p, y) = y \log(\delta(p)) + (1-y)\log(1-\delta(p)),$$

$\delta(p)$ is a sigmoid function, in some aspects, $\delta(p)$ is defined as:

$$\delta(p) = \frac{1}{1 + \exp(-p)}$$

i is an index of an image portion (e.g. pixel), i=1, 2, 3, ..., N, where N is the number of portions, $P_{ij}$ is produced by the model. Pij may represent, in some aspects, an image segmentation as described in this disclosure. For each portion, $P_{i0}$ may represent a predicted probability of the portion being background. Pij (j=1, 2, 3 ..., n) may represent a probability of the $i^{th}$ portion being included in a particular type of body part segment (e.g., in some aspects, a number of different types of body part segments may be equivalent to six (n=6), for example, in embodiments performing human body segmentation), Concat( ) is a function that concatenates two matrices. For example, concatenate matrix of shape (10,1) and (10,1) will produce (10, 2), $S_{i\_fgbg}$ has the shape of N times 2, with a first column denoting a probability of background, and a second column denoting a probability of the foreground. In some aspects, if a portion is part of a foreground, then it is included in at least one body part segment, $L_{i\_fgbg}$ is a binary foreground/background label, and $L_{ic}$ defines an initial segmentation generated with body part templates.

FIG. 1 demonstrates one embodiment of how the portions of Equation 1 may be generated and flow. For example, FIG. 1 shows that the template labeling component 106 may generate $L_{ic}$, which defines an initial segmentation. The foreground/background component 104 may generate $L_{i\_rgbg}$. The model 108 may generate $P_{ij}$. The concatenation 114, referenced in Equation 1 above, may reorganize information relating to background/foreground determinations generated by the model 108, and the probabilities that particular portions of an image are included in particular body segments (e.g., 630), so as to generate $S_{i\_fgbg}$. The loss is provided to the model 108.

In operation 1040, the loss, original segmentation, updated segmentation, and the training image are related in the training data. How these data are related may depend on the particular type of model employed within FIG. 10.

Decision operation 1050 determines whether there are additional training images (e.g., 102) to process. If there are, operation 710/750 returns to operation 1010. Otherwise, operation 710/750 completes.

FIG. 11 shows results of some of the embodiments disclosed herein. The table compares results of baseline implementations and the disclosed embodiments as measured by mean intersection over union (mIOU) (higher numbers indicate better results). As shown, mIOU values in the first row 1105a (DeepLab+Fully) of the table are close to mIOU values in row 1105d (Ours+weakly). This demonstrates that the embodiments disclosed herein can achieve similar performance as those that require expensive human input to supply mask annotations. In contrast, the disclosed methods perform similarly while utilizing less expensive keypoint annotations. An additional observation is that mIOU values of row 1105c are better than that of row 1105b. This demonstrates that by combining the part mask annotation and key point annotation, the disclosed embodiments provide state of the art performance on this dataset.

According to the disclosed embodiments, a model is trained to provide body part parsing without any part annotations. Specifically, there are two key factors for part parsing, the human part structure and the detailed shape of each part. The human part structure generates reliable coarse part masks (e.g., not to confuse arms with legs) whereas the detailed shape provides part masks that fit accurately with image boundaries. The disclosed embodiments train a model separately based on part structures and part shapes. Namely, the learning part structures are disentangled from the part shapes based on weak supervision and image information. In an embodiment, first simple part priors are generated based on poses (e.g., templates for different part structures are created based on joint information). The model is then trained based on the simple part priors to generate a reasonable initial part structure prediction. Then the model is refined with full masks supervision and image features to predict part shapes.

In an embodiment, the generated part priors contain three types of regions: estimated background represented with black, unknown region represented with white, and estimated foreground represented with other colors. In some implementations, human poses are converted to part prior masks or templates.

Software Architecture

Figure 12:
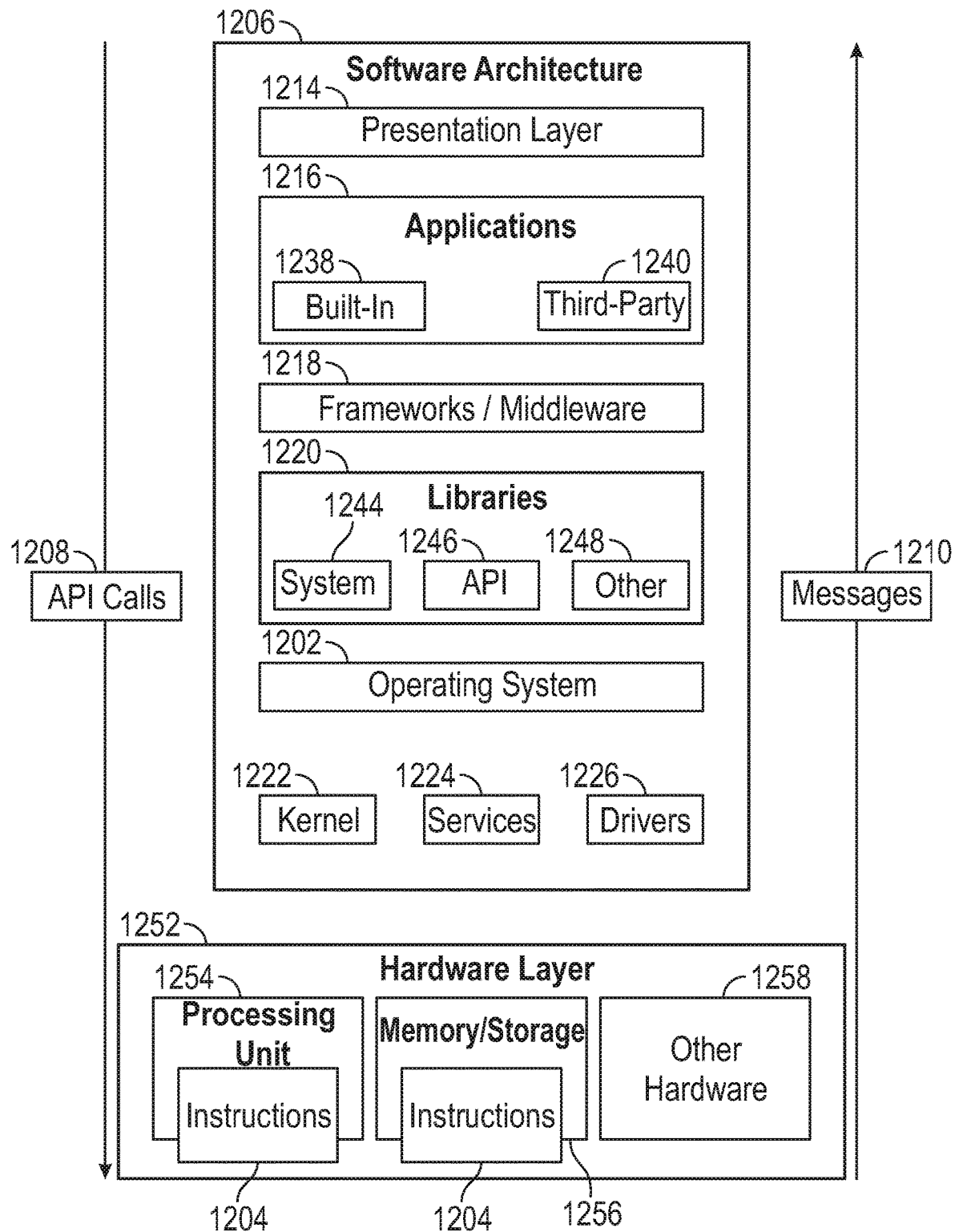
FIG. 12 is a block diagram illustrating an example software architecture.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as a machine 1300 of FIG. 13 that includes, among other things, processors 1304, memory/storage 1306, and I/O components 1318. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes memory and/or storage 1256, which also have the executable instructions 1204. The hardware layer 1252 may also comprise other hardware 1258.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive a response as messages 1210. The layers illustrated are representative in nature and not all software architectures have all layers. For example, some mobile or special-purpose operating systems may not provide a frameworks/middleware 1218 layer, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems interactions with a user may occur through a presentation layer, such as the presentation layer 1214. In these systems, the application/component "logic" can be separated from the aspects of the application/component that interact with a user.

Exemplary Machine

Figure 13:
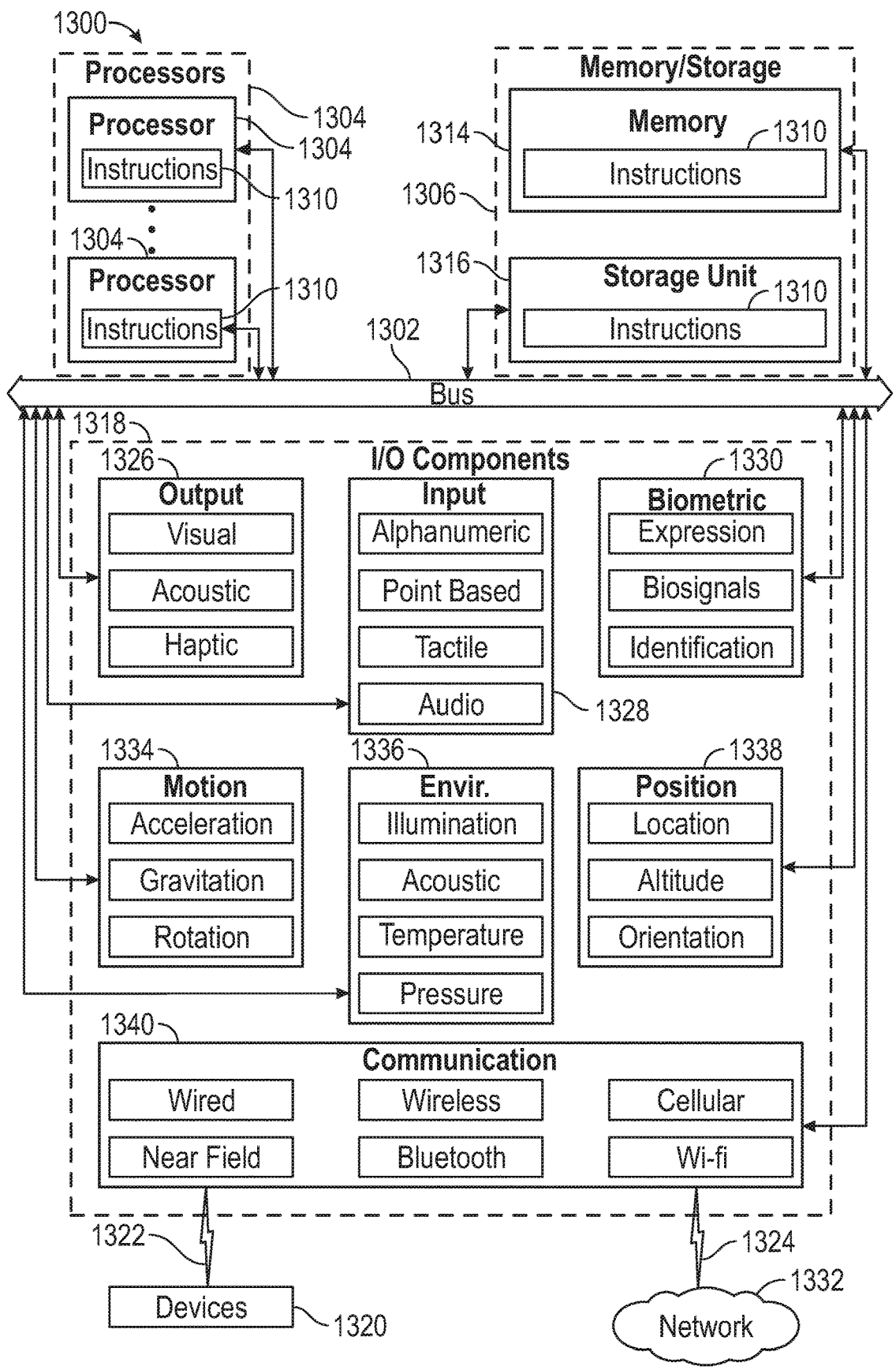
FIG. 13 is a block diagram illustrating exemplary components (also referred to herein as "modules") of a machine.

FIG. 13 is a block diagram illustrating components (also referred to herein as "modules") of a machine 1300, according to some exemplary embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of the processors 1304 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1318 may include a wide variety of components to provide a user interface for receiving input, providing output, producing output, transmitting information, exchanging information, capturing measurements, and so on. The specific I/O components 1318 that are included in the user interface of a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various exemplary embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1328 may also include one or more image-capturing devices, such as a digital camera for generating digital images and/or video.

In further exemplary embodiments, the I/O components 1318 may include biometric components 1330, motion components 1334, environment components 1336, or position components 1338, as well as a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322 respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geo-location, location via Wi-Fi® signal triangulation, location via detecting an NFC beacon signal that may indicate a particular location, and so forth.

Example 1 is a method, comprising: obtaining, via hardware processing circuitry, a plurality of training images representing a corresponding plurality of figures; obtaining, via the hardware processing circuitry, data indicating joint positions of joints of the figures within each of the representations; obtaining, via the hardware processing circuitry, data indicating joint types of the joints at each of the indicated joint positions; selecting, from a library of body part templates, via the hardware processing circuitry, one or more body part templates associated with one or more of the indicated joint types for each representation, each body part template representing a particular type of body part; obtaining, via the hardware processing circuitry, an indication of a foreground of each of the training images; determining, via the hardware processing circuitry, a segmentation for each of the training images, each segmentation defining positions for one or more body parts in the segmentation, the determining comprising determining the positions for each of the one or more body parts based on the body part template representing the body part, and the joint positions for joints having a joint type associated with the body part template; training, via the hardware processing circuitry, a model based on the training image and the segmentations for each of the training images; and segmenting, via the hardware processing circuitry, a new image based on the trained model.

In Example 2, the subject matter of Example 1 optionally includes generating updated segmentations for the training images based on the trained model, and retraining the model based on the training images and the updated segmentations.

In Example 3, the subject matter of Example 2 optionally includes refining the updated segmentations based on a conditional random field (CRF) model, wherein the retraining of the model is further based on the refined updated segmentations.

In Example 4, the subject matter of any one or more of Examples 1-3 optionally includes wherein determining the positions for each of the one or more body parts comprises: selecting two joints in the figure having joint types associated with a body part template representing the body part; determining a distance between positions of the two selected joints; scaling the body part based on the body part template and the distance; and positioning the body part in the segmentation so as to align the positions of the two selected joints with corresponding joint positions defined by the body part template representing the body part.

In Example 5, the subject matter of Example 4 optionally includes wherein corresponding joint positions have equivalent joint types.

In Example 6, the subject matter of any one or more of Examples 4-5 optionally includes wherein the positioning of the body part comprises rotating the body part based on the joint positions defined by the body part template representing the body part and the positions of the two selected joints.

In Example 7, the subject matter of Example 6 optionally includes wherein the positioning aligns a first joint position for a first joint of a first type of the segmentation with a second joint position for a second joint of the first type defined by the body part template representing the body part.

In Example 8, the subject matter of any one or more of Examples 1-7 optionally includes positioning an article of clothing based on the segmentation of the new image.

In Example 9, the subject matter of Example 8 optionally includes performing an ecommerce purchase transaction of the article of clothing in response to the positioning.

In Example 10, the subject matter of any one or more of Examples 1-9 optionally includes wherein the library of body part templates includes templates for at least an upper arm, lower arm, upper leg, lower leg, head, and torso.

Example 11 is a method, comprising: obtaining an image, the image representing a figure; and segmenting the figure using a model, the model trained with a plurality of training images, each training image representing a training figure, and a corresponding plurality of segmentations of the training figure, each segmentation generated by positioning predefined body part templates representing body parts between defined positions of joints of the figure.

In Example 12, the subject matter of Example 11 optionally includes segmenting the model based on a convolutional neural network.

Example 13 is a system, comprising: hardware processing circuitry; a hardware memory storing instructions that when executed by the hardware processing circuitry configure the hardware processing circuitry to perform operations comprising: obtaining a plurality of training images representing a corresponding plurality of figures; obtaining data indicating joint positions of joints of the figures within each of the plurality of training images; obtaining data indicating joint types of the joints at each of the indicated joint positions; selecting, from a library of body part templates, one or more body part templates associated with one or more of the indicated joint types for each representation, each body part template representing a particular type of body part; obtaining an indication of a foreground of each of the training images; determining a segmentation for each of the training images, each segmentation defining positions for one or more body parts in the segmentation, the determining comprising determining the positions for each of the one or more body parts based on the body part template representing the body part, and the joint positions for joints having a joint type associated with the body part template; training a model based on the training image and the segmentations for each of the training images; and segmenting a new image based on the trained model.

In Example 14, the subject matter of Example 13 optionally includes generating updated segmentations for the training images based on the trained model, and retraining the model based on the training images and the updated segmentations.

In Example 15, the subject matter of Example 14 optionally includes refining the updated segmentations based on a conditional random field (CRF) model, wherein the retraining of the model is further based on the refined updated segmentations.

In Example 16, the subject matter of any one or more of Examples 14-15 optionally includes wherein determining the positions for each of the one or more body parts comprises: selecting two joints in the figure having joint types associated with a body part template representing the body part; determining a distance between positions of the two selected joints; scaling the body part based on the body part template and the distance; and positioning the body part in the segmentation so as to align the positions of the two selected joints with corresponding joint positions defined by the body part template representing the body part.

In Example 17, the subject matter of Example 16 optionally includes wherein corresponding joint positions are joints positions with equivalent joint types.

In Example 18, the subject matter of any one or more of Examples 16-17 optionally includes wherein the positioning of the body part comprises rotating the body part based on the joint positions defined by the body part template representing the body part and the positions of the two selected joints.

In Example 19, the subject matter of any one or more of Examples 17-18 optionally includes wherein the positioning aligns a first joint position for a first joint of a first type of the segmentation with a second joint position for a second joint of the first type defined by the body part template representing the body part.

In Example 20, the subject matter of any one or more of Examples 14-19 optionally includes positioning an article of clothing based on the segmentation of the new image.

In Example 21, the subject matter of Example 20 optionally includes performing an ecommerce purchase transaction of the article of clothing in response to the positioning.

In Example 22, the subject matter of any one or more of Examples 14-21 optionally includes wherein the library of body part templates includes templates for at least an upper arm, lower arm, upper leg, lower leg, head, and torso.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A method comprising:
   generating an initial segmentation for a training image, the initial segmentation indicating, without body part annotations, probabilities that a portion of the training image corresponds to particular body parts of a figure, the probabilities based on joints in the figure;
   training a first model based on the training image and the initial segmentation;
   generating a new segmentation for the training image based on the trained first model;
   refining the new segmentation using a conditional random field (CRF) model;
   reinitializing the trained first model; and
   re-training the first model based on the training image and the refined new segmentation.

2. The method of claim 1, further comprising:
   obtaining, via hardware processing circuitry, a plurality of training images representing a corresponding plurality of figures;
   obtaining, via the hardware processing circuitry, data indicating joint positions of joints of the figures within each of the plurality of training images;
   obtaining, via the hardware processing circuitry, data indicating joint types of the joints at each of the indicated joint positions;
   selecting, from a library of body part templates, via the hardware processing circuitry, one or more body part templates associated with one or more of the indicated joint types for each of the plurality of training images, each body part template representing a particular type of body part; and
   determining, via the hardware processing circuitry, a segmentation for each of the plurality of training images using the first model.

3. The method of claim 2, further comprising:
   selecting, for a given training image, two joints having joint types associated with the body part template representing the body part;
   determining a distance between positions of the two selected joints; and
   scaling the body part based on the body part template and the distance.

4. The method of claim 1, further comprising:
   positioning a particular one of the body parts to align positions of two selected joints with corresponding joint positions defined by a body part template representing the particular one of the body parts.

5. The method of claim 4, wherein corresponding joint positions have equivalent joint types.

6. The method of claim 4, wherein the positioning comprises rotating the particular one of the body parts based on the joint positions defined by the body part template representing the particular one of the body parts and the positions of the two selected joints.

7. The method of claim 6, wherein the positioning aligns a first joint position for a first joint of a first type with a second joint position for a second joint of the first type defined by the body part template representing the particular one of the body parts.

8. The method of claim 1, further comprising:
   positioning an article of clothing based on a segmentation of a new image determined using the first model; and
   performing an ecommerce purchase transaction of the article of clothing in response to the positioning.

9. The method of claim 1, further comprising:
   displaying the training image on an electronic display for viewing by a user; and
   receiving input, via a user interface, that indicates one or more locations of joints within the training image.

10. The method of claim 1, further comprising applying a neural network to the training image to determine joint locations.

11. The method of claim 1, wherein a body part template representing a particular one of the body parts comprises an ellipse or polygon without any fitting parameters, and a length location and angle of the body part template is calculated based on related joints.

12. A system, comprising:
hardware processing circuitry; and
a hardware memory storing instructions that, when executed by the hardware processing circuitry, configure the hardware processing circuitry to perform operations comprising:
generating an initial segmentation for a training image, the initial segmentation indicating, without body part annotations, probabilities that a portion of the training image corresponds to particular body parts of a figure, the probabilities based on joints in the figure;
training a first model based on the training image and the initial segmentation;
generating a new segmentation for the training image based on the trained first model;
refining the new segmentation using a conditional random field (CRF) model;
reinitializing the trained first model; and
re-training the first model based on the training image and the refined new segmentation.

13. The system of claim 12, the operations further comprising:
obtaining an indication of a foreground of the training image; and
generating updated segmentations for the training images based on the first model and based on the indication of the foreground.

14. The system of claim 12, the operations further comprise:
obtaining a plurality of training images representing a corresponding plurality of figures;
obtaining data indicating joint positions of joints of the figures within each of the plurality of training images;
obtaining data indicating joint types of the joints at each of the indicated joint positions;
selecting, from a library of body part templates, one or more body part templates associated with one or more of the indicated joint types for each of the plurality of training images, each body part template representing a particular type of body part; and
determining a segmentation for each of the plurality of training images using the first model.

15. The system of claim 14, the operations further comprise:
selecting, for a given training image, two joints having joint types associated with the body part template representing the body part;
determining a distance between positions of the two selected joints; and
scaling the body part based on the body part template and the distance.

16. The system of claim 12, the operations further comprise positioning a particular one of the body parts to align positions of two selected joints with corresponding joint positions defined by a body part template representing the particular one of the body parts.

17. The system of claim 16, wherein corresponding joint positions have equivalent joint types.

18. The system of claim 16, wherein the positioning comprises rotating the particular one of the body parts based on the joint positions defined by the body part template representing the particular one of the body parts and the positions of the two selected joints.

19. The system of claim 18, wherein the positioning aligns a first joint position for a first joint of a first type with a second joint position for a second joint of the first type defined by the body part template representing the particular one of the body parts.

20. A non-transitory computer-readable medium comprising non-transitory computer-readable instructions for performing operations comprising:
generating an initial segmentation for a training image, the initial segmentation indicating, without body part annotations, probabilities that a portion of the training image corresponds to particular body parts of a figure, the probabilities based on joints in the figure;
training a first model based on the training image and the initial segmentation;
generating a new segmentation for the training image based on the trained first model;
refining the new segmentation using a conditional random field (CRF) model;
reinitializing the trained first model; and
re-training the first model based on the training image and the refined new segmentation.

* * * * *